US006831243B2

(12) United States Patent
Boensch

(10) Patent No.: US 6,831,243 B2
(45) Date of Patent: Dec. 14, 2004

(54) METHOD FOR SORTING ITEMS ACCORDING TO DISTRIBUTION ADDRESS

(75) Inventor: Wolfgang Boensch, Stockach (DE)

(73) Assignee: Siemens Aktiengesellschaft, München (DE)

( * ) Notice: Subject to any disclaimer, the term of this patent is extended or adjusted under 35 U.S.C. 154(b) by 24 days.

(21) Appl. No.: 10/353,035

(22) Filed: Jan. 29, 2003

(65) Prior Publication Data

US 2003/0155283 A1 Aug. 21, 2003

Related U.S. Application Data

(63) Continuation of application No. PCT/DE01/03002, filed on Aug. 13, 2001.

(51) Int. Cl.[7] .................................................. G06K 9/00

(52) U.S. Cl. ....................................... 209/584; 209/900

(58) Field of Search ................................. 209/900, 584

(56) References Cited

U.S. PATENT DOCUMENTS

| | | | | | |
|---|---|---|---|---|---|
| 4,520,932 A | * | 6/1985 | Matsuda et al. | 209/545 |
| 4,968,419 A | * | 11/1990 | Karalus et al. | 209/539 |
| 4,993,700 A | * | 2/1991 | Winkler | 271/186 |
| 5,042,667 A | * | 8/1991 | Keough | 209/3.1 |
| 5,115,918 A | * | 5/1992 | DeWitt et al. | 209/3.1 |
| 5,119,954 A | | 6/1992 | Svyatsky et al. | |
| 5,397,003 A | * | 3/1995 | Stevens et al. | 209/534 |
| 5,540,338 A | * | 7/1996 | Stevens et al. | 209/534 |
| 5,558,232 A | * | 9/1996 | Stevens et al. | 209/584 |
| 5,737,438 A | * | 4/1998 | Zlotnick et al. | 382/101 |
| 6,151,422 A | * | 11/2000 | Hayduchok et al. | 382/286 |
| 6,236,009 B1 | * | 5/2001 | Emigh et al. | 209/584 |
| 6,291,785 B1 | * | 9/2001 | Koga et al. | 209/584 |
| 6,303,889 B1 | * | 10/2001 | Hayduchok et al. | 209/584 |
| 6,381,342 B2 | * | 4/2002 | Foley | 382/101 |
| 6,408,084 B1 | * | 6/2002 | Foley | 382/101 |
| 6,443,311 B2 | * | 9/2002 | Hendrickson et al. | 209/542 |
| 6,533,266 B1 | * | 3/2003 | Schererz et al. | 271/225 |
| 6,665,422 B1 | * | 12/2003 | Seidel et al. | 382/101 |
| 6,688,593 B1 | * | 2/2004 | Auerbach | 271/184 |
| 2003/0155282 A1 | * | 8/2003 | Kechel | 209/584 |

FOREIGN PATENT DOCUMENTS

| | | |
|---|---|---|
| DE | 19624977 A1 | 1/1998 |
| DE | 19729709 A1 | 1/1999 |
| WO | PCT/DE97/02326 | 4/1998 |
| WO | PCT/DE97/02803 | 6/1998 |

OTHER PUBLICATIONS

Derwent Abstract for DE19729709.
Derwent Abstract for DE19624977.

* cited by examiner

*Primary Examiner*—Donald P. Walsh
*Assistant Examiner*—Matthew J. Kohner
(74) *Attorney, Agent, or Firm*—Siemens AG; Jacob Eisenberg

(57) ABSTRACT

The invention concerns a method for the sorting of items such as mail pieces, according to their distribution addresses, in a sorting machine, whereby non-readable mail pieces are sorted into special bins for recirculation according to the different reasons for the non-reading. Beginning and end of the stack of mail pieces of the respective special bin for recirculation is readably marked for sorting machine reading, and the marked stack of mail pieces is again fed to the feeder of the sorting machine in the reading position and orientation. At unsuccessful reattempts of a mail piece of a marked stack of mail pieces from one of the special bins for recirculation, the mail piece is sorted into an additional special bin, from which it is no longer fed to the sorting machine.

17 Claims, 1 Drawing Sheet

METHOD FOR SORTING ITEMS ACCORDING TO DISTRIBUTION ADDRESS

CROSS REFERENCE TO RELATED APPLICATIONS

The present application is a continuation of and claims priority to International Application number PCT/DE01/03002, filed Aug. 13, 2001 and further claims priority to German patent application number 10037756.4, filed Feb. 8, 2000 the both of which are herein incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to a method for sorting items, such as postal or mail items, according to their distribution addresses. Herein, a surface of a mail item is recorded with the help of a picture recording unit. The recorded image is relayed to an image evaluating unit where it is determined whether the address surface, facing the picture recording unit, is in a correct orientation for effective reading and/or evaluation of at least the address field of the address surface. If the correct position is present, a read of the distribution address is effected and, if successful, a respective sorting takes place. The mail items which have an incorrect orientation or a position with the addresses turned away from the picture recording unit are led into a special bin. The orientation and position of the mail items are then corrected and the mail items are sent back to the sorting machine from these special bins, i.e. they arrive together with new mail items on the feeder of the mail separator. Should the direct reading process of the distributing address be thereafter started, it may occur that the reading process cannot be completed successfully. In this case, the mail items are also sorted into a special bin from which they are fed to the sorting machine for a new reading attempt. It may occur during tie new sorting runs, that the reattempted reading is still not correct or effective leading to successive repetition of the above steps. Accordingly, successive sorting to special bins and reintroduction into the main mail sorting stream may result in damage to the mail item(s) and/or throughput reduction.

SUMMARY OF THE INVNETION

The present invention is directed to a method for avoiding multiple resorting of mail pieces which were already sorted to special bins based on non-readability. Particular markings, on for example a mail item stack, are implemented to indicate when mail items from special bins are up for recirculation, This is in contrast to mail items being sorted for an initial reading. If a recirculation is determined, the mail item is sorted into an additional sorting bin, out from which they are not fed again into the reading and sorting process of the sorting machine, if the mail pieces to be fed have an awkward position or orientation for reading, then their position is corrected prior to recirculation. Accordingly, uncontrolled multiple cycles of the reading and sorting process is thereby avoided.

It is advantageous to mark the beginning and end of a stack of mail pieces from a special bin for recirculation by a prearranged and/or subordinate separating card, which is recognizable by the sorting machine, and which may be provided with machine-readable identifications.

It is also advantageous, to mark the beginning and end of a stack of mail pieces from a special bin for recirculation by marking the first and last mail piece with lightly adhering and residue-free removable labels which may further be provided with a machine-readable identification.

To discharge the picture recording unit and the image evaluating unit and to thereby shorten the reading process, it is also advantageous to use a special reader, which is also usable for other tasks, for the recognition of the marked beginning and end of the respective stack.

The present invention is further directed to a method for sorting items according to a destination address, comprising the steps of: recording a surface of the item with a picture recording unit, said picture recording unit being a part of an item sorting machine; determining the presence of said address with an image evaluation unit, and if said address is present, reading said address with said image evaluation unit; if said address is not readable, sorting said item into a select bin; determining when said bin contains a select number of items thereby forming a stack of items within said bin; marking a beginning and end of said stack; reorienting said stack, into a select appropriate position; directing said select positioned stack from said bin to an entrance of said sorting machine; reading addresses of items in said stack; and if said step of reading addresses of items in said stack is unsuccessful, sorting unsuccessfully read items into a select special bin.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1:
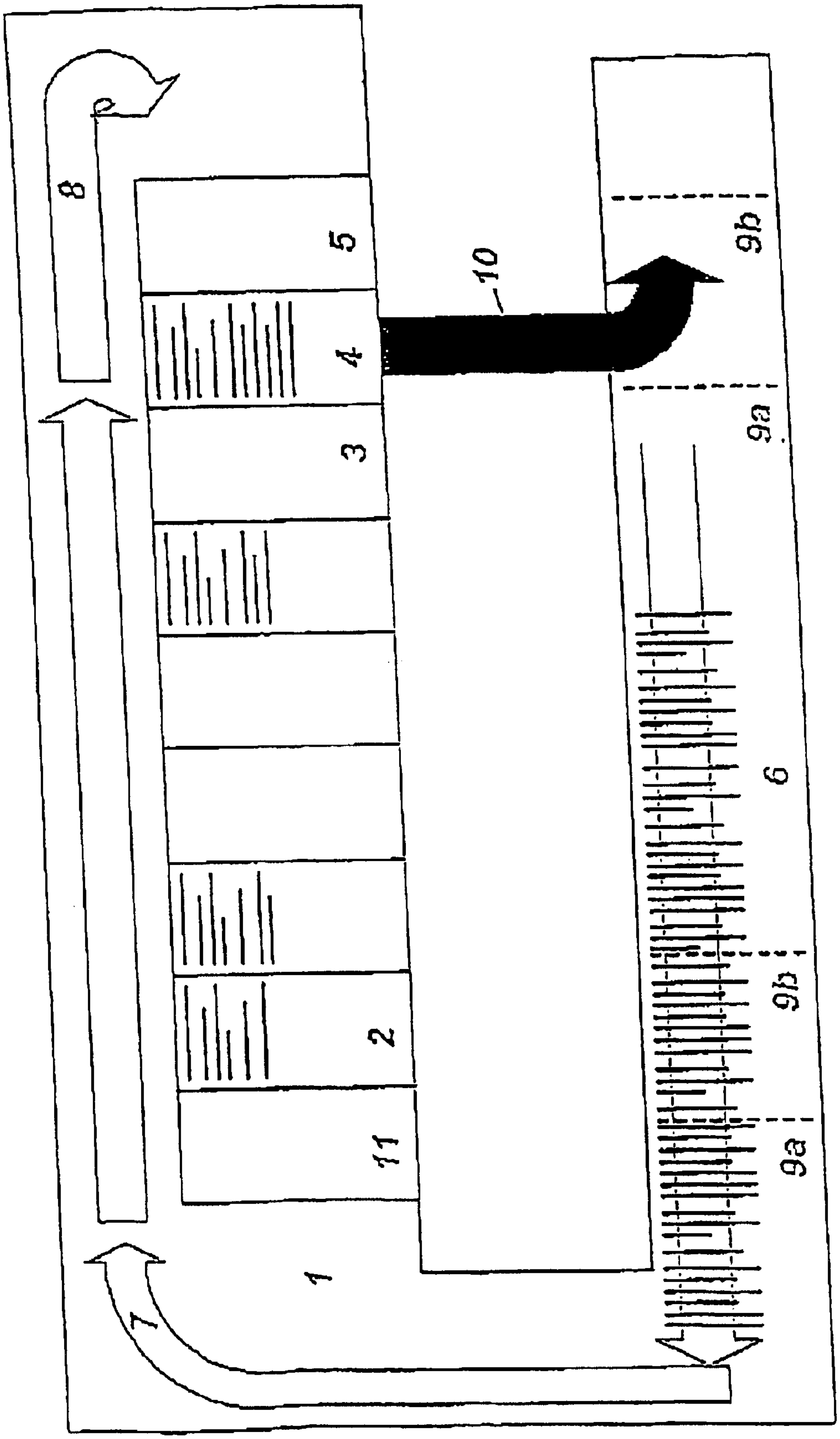
FIG. 1 depicts a schematic view of a process according to the invention.

FIG. 1 depicts a schematic of an intermediate stacker. The stacker may be semiautomatic. In the stacker, a mail surface of each mail piece is recorded, after the mail separation, with a generally known and therefore undisclosed picture recording device, evaluated in an also generally known image evaluating unit, and distributed in accordance with the evaluation results. The mail separation, picture recording, and image evaluation are indicated by the arrow 7.

When, via the image evaluation, it is determined that the concerned mail item has an awkward position, i e, the addresses and/or stamps and/or imprints are turned away from the picture recording unit, the mail piece is subsequently led to special bin 4 for laterally reversed mail items. The leading is effected by appropriate positioned diverter units. Mail items, which address sides are turned to the picture recording unit but have an incorrect orientation (for example upside down), are led into a sorting bin 3 for mail pieces with incorrect orientation. The addresses (at least the zip codes) from the mail pieces with the correct position and orientation are read. Afterwards, they are distributed into sorting bins 2 and allocated to determined address areas after successful reading. If the addresses are not automatically read, despite correct position and orientation, the items are frequently sorted in a further sorting bin 5. The distribution process into the bins 2, 3, 4, 5, by a diverter unit, is indicated by arrow 8.

After the sorting bins 2 contain a select number of items and/or are filled, the bins are manually emptied and the contents sent to the corresponding address areas. The stack of mail items from the special bin 4, for laterally reversed mail items, is also manually picked up and placed corrected in its position on the feeder 6 of the sorting machine/intermediate stacker 1. Separating cards 9*a, b* are inserted for the marking of this stack before the first mail piece and after the last mail piece of this stack. These separating cards 9*a,b* must be identifiable by the sorting machine/intermediate stacker 1, which may be effected by an imprinted machine-readable code. Of course, the above manual steps may be performed by an appropriately configured automated apparatus.

Without the marking of the stack, it has occurred up until now that the evaluating software for the position recognition of a mail piece always determines a "backwards position" for some mail pieces (independent of actual position), so that these mail pieces are always fed again into special bin 4. This is particularly true with the continuous subtraction of new mail pieces, because approximately half of all mail pieces arrive in special bin 4 for laterally reversed position and therefore the number of the mail pieces in this bin 4 does not decrease. An operator may therefore not recognize if the mail pieces are in special bin 4 are only the ones which were already identified as mail pieces with laterally reversed positions. The same applies for mail pieces with the incorrect orientation or incorrect reading results. These several undesired passages are avoided by the marking of the stack from the special bins 3, 4, 5. Where the beginning of such a stack is determined from a separating card 9*a*, the machine control is then put into a condition at which mail pieces, despite correction of a recognized incorrect position or orientation or address read twice unsuccessfully, are sorted into an additional special bin 11.

The penultimate bin to the right of FIG. 1 is configured as special bin 4 for laterally reversed mail pieces, in the intermediate stacker 1. These mail pieces are turned during the recirculation, which is indicated by the dark arrow 10, and placed between the separating cards 9*a,b* on the feeder 6. As depicted, more than one of these marked stacks of mail items on the feeder 6 can be present. At a recognized incorrect orientation or position of a mail piece in the marked stacks, the piece is led to the additional special bin 11, at the very left, from where the mail pieces are no longer fed to feeder 6. This control state is abandoned as soon as a separating card 9*b* is recognized, the card 9*b* marking the end of this stack of mail pieces. The mail pieces with laterally reversed positions, which run through the machine for the first time, arrive as usual in the special bin 4. The marked stack may be recognizable by an additional reading and/or evaluation unit associated with the sorting machine.

The addresses of the mail pieces, which are not read automatically, despite correct position and orientation, are placed again on the feeder 6 without correction, in the hope that the second reading attempt is more successful. To avoid a repeated passage in this case as well, the stacks of mail pieces from this special bin are also marked.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

I claim:

1. A method for sorting an item according to its destination address, comprising the steps of:

recording an image of a surface of the item with a picture recording unit, the picture recording unit being a part of an item sorting machine;

determining the destination address is present in the image with an image evaluation unit;

if the address is present, reading the address with the image evaluation unit;

determining if the address was readable;

if the address was not readable, sorting the item into a select bin;

determining if the select bin contains a select number of items in a stack formation;

if a stack is determined, reorienting the stack into a select appropriate position;

marking a beginning and end of the stack;

directing the stack from the select bin to an entrance of the sorting machine;

reading addresses of items in the stack;

determining if any of the addresses of items in the stack were readable; and if any of the addresses were not readable, sorting items having non-readable addresses into a select special bin.

2. The method according to claim 1, wherein a beginning and an end of the stack is marked by prearranged separating cards comprising readable code.

3. The method according to claim 2 wherein the code is machine readable code.

4. The method according to claim 3, wherein the code is readable by the sorting machine.

5. The method according to claim 1, further comprising the steps of marking a first and a last item in the stack as being a first and last item respectively.

6. The method according to claim 5, wherein the marking comprises a removable adhesive and includes readable instruction for item recirculation.

7. The method according to claim 6, wherein the marking comprises machine-readable code.

8. The method according to claim 6, wherein the removable adhesive is residue free upon removal.

9. The method according to claim 1, further comprising the step of recognizing a marked stack with an additional reading unit accommodated within the sorting machine.

10. The method according to claim 1, wherein the item is a mail piece.

11. The method according to claim 1, wherein the step of determining the presence of the address further comprises the step of determining the presence of at least one stamp on the item with the image evaluation unit.

12. The method according to claim 1, wherein the step of determining the presence of the address further comprises the step of determining the presence of at least one imprint on the item with the image evaluation unit.

13. The method according to claim 1, wherein each of the select bin is delineated by different causes of unreadability.

14. The method according to claim 1, wherein the step of marking a beginning and end of the stack further comprises the step of marking with indicators, the indicators including readable instructions to recirculate an item after the step of reorientation.

15. The method according to claim 14, wherein the readable instructions are machine readable instructions.

16. The method according to claim 1, wherein the select appropriate position is a reading position.

17. The method according to claim 1, wherein the step of if the step of reading addresses of items in the stack is unsuccessful, sorting unsuccessfully read items into a select special bin, further comprises the step of not sorting the unsuccessfully read items to the sorting machine.

* * * * *